United States Patent
Yotsumoto et al.

(10) Patent No.: US 11,759,975 B2
(45) Date of Patent: Sep. 19, 2023

(54) ULTRASONIC RESONATOR SUPPORT STRUCTURE AND ULTRASONIC VIBRATION MACHINING APPARATUS

(71) Applicant: TAKADA CORPORATION, Kitakyushu (JP)

(72) Inventors: Keiichi Yotsumoto, Kitakyushu (JP); Nobuhiro Mori, Kitakyushu (JP); Naoki Kubo, Kitakyushu (JP); Hironobu Matsuyama, Kitakyushu (JP)

(73) Assignee: TAKADA CORPORATION, Kitakyushu (JP)

( * ) Notice: Subject to any disclaimer, the term of this patent is extended or adjusted under 35 U.S.C. 154(b) by 0 days.

(21) Appl. No.: 17/635,270

(22) PCT Filed: Aug. 24, 2020

(86) PCT No.: PCT/JP2020/031848
§ 371 (c)(1),
(2) Date: Feb. 14, 2022

(87) PCT Pub. No.: WO2021/039720
PCT Pub. Date: Mar. 4, 2021

(65) Prior Publication Data
US 2022/0266298 A1    Aug. 25, 2022

(30) Foreign Application Priority Data

Aug. 30, 2019   (JP) .................................. 2019-158105

(51) Int. Cl.
*B06B 1/02*   (2006.01)
*B06B 3/00*   (2006.01)
(Continued)

(52) U.S. Cl.
CPC ................ *B28D 5/022* (2013.01); *B06B 3/00* (2013.01); *B23C 3/04* (2013.01); *B24B 1/04* (2013.01);
(Continued)

(58) Field of Classification Search
CPC .... B26B 1/02; B26B 3/00; B24B 1/04; B24B 55/00; B28D 1/00; B28D 5/02;
(Continued)

(56) References Cited

U.S. PATENT DOCUMENTS 3,239,965 A * 3/1966 Roney ...................... B24B 1/04
                                                             451/342
3,471,724 A * 10/1969 Lewis .................... H10N 35/00
                                                             310/26

(Continued)

FOREIGN PATENT DOCUMENTS

CA      2 296 621 A1    7/2000
CN      1169891 A       1/1998
(Continued)

OTHER PUBLICATIONS

Office Action dated Jun. 13, 2022, issued in counterpart to CN application No. 202080058175.1 with Search Report and English Translation. (11 pages).

(Continued)

*Primary Examiner* — Ghassem Alie
(74) *Attorney, Agent, or Firm* — WHDA, LLP

(57) ABSTRACT

An ultrasonic resonator support structure including a holder supports an ultrasonic resonator at both sides such that the ultrasonic resonator is rotatable to the holder. The ultrasonic resonator includes an ultrasonic horn with a machining tool attached, and a first booster and a second booster coaxially fixed one by one to both ends in the axial directions of the ultrasonic horn. The holder has a rolling bearing mechanism
(Continued)

that rotatably supports the first booster side of the ultrasonic resonator and a gas bearing mechanism that rotatably supports the second booster side of the ultrasonic resonator.

18 Claims, 4 Drawing Sheets

(51) Int. Cl.
| | |
|---|---|
| *B24B 1/04* | (2006.01) |
| *B28D 1/00* | (2006.01) |
| *B28D 5/02* | (2006.01) |
| *B23C 3/04* | (2006.01) |
| *B24B 55/00* | (2006.01) |
| *B28D 5/04* | (2006.01) |

(52) U.S. Cl.
CPC ............. *B24B 55/00* (2013.01); *B28D 5/02* (2013.01); *B23B 2270/10* (2013.01); *B28D 5/047* (2013.01)

(58) Field of Classification Search
CPC .. B28D 5/0058; B28D 5/047; B23B 2270/10; B23C 3/04
USPC .......................................................... 83/490
See application file for complete search history.

(56) References Cited

U.S. PATENT DOCUMENTS

| | | | | |
|---|---|---|---|---|
| 5,730,832 | A * | 3/1998 | Sato | ................... B29C 66/8322 |
| | | | | 156/499 |
| 5,883,460 | A | 3/1999 | Sato et al. | |
| 6,786,384 | B1 * | 9/2004 | Haregoppa | ............... B06B 3/00 |
| | | | | 156/580.2 |
| 2002/0115399 | A1 * | 8/2002 | Lee | ....................... B28D 1/121 |
| | | | | 451/547 |
| 2003/0168938 | A1 * | 9/2003 | Wallaschek | ............. H01L 24/75 |
| | | | | 310/328 |
| 2004/0065415 | A1 | 4/2004 | Sato et al. | |
| 2010/0158307 | A1 * | 6/2010 | Kubota | ................... B23B 37/00 |
| | | | | 381/400 |

FOREIGN PATENT DOCUMENTS

| | | | |
|---|---|---|---|
| CN | 102728857 | A | 10/2012 |
| CN | 204366060 | U | 6/2015 |
| CN | 106334805 | A | 1/2017 |
| JP | 3-87501 | U | 9/1991 |
| JP | 3-98979 | U | 10/1991 |
| JP | 10-15491 | A | 1/1998 |
| JP | 2000-93894 | A | 4/2000 |
| JP | 2000-210928 | A | 8/2000 |
| JP | 2004-122033 | A | 4/2004 |
| JP | 2004-330228 | A | 11/2004 |
| JP | 2006-247808 | A | 9/2006 |
| JP | 2014-108471 | A | 6/2014 |
| JP | 2018-126967 | A | 8/2018 |
| KR | 200412661 | Y1 * | 3/2006 ........... B23K 20/103 |
| KR | 101879451 | B1 * | 7/2018 .......... F16C 32/0603 |
| WO | 2009/101987 | A1 | 8/2009 |

OTHER PUBLICATIONS

Decision to Grant a Patent dated Aug. 18, 2020, issued in counterpart of Japanese Patent Application No. 2019-158105, with English Translation. (5 pages).
International Search Report dated Nov. 2, 2020, issued in counterpart International Application No. PCT/JP2020/031848, with English Translation. (6 pages).
Notice of the Opinion on Examination dated Apr. 21, 2021, issued in counterpart TW patent Application No. 109129368 with Search Report, with English Translation. (5 pages).
Notice of Allowance dated Jul. 26, 2021, issued in counterpart TW patent Application No. 109129368 with Search Report, with English Translation. (3 pages).

* cited by examiner

ULTRASONIC RESONATOR SUPPORT STRUCTURE AND ULTRASONIC VIBRATION MACHINING APPARATUS

TECHNICAL FIELD

The present invention is related to an ultrasonic resonator support structure used mainly for machining hard and brittle materials such as semiconductor wafers (i.e. silicon wafers), and related to an ultrasonic vibration machining apparatus.

BACKGROUND ART

Patent literature 1 discloses an ultrasonic vibration cutting apparatus for cutting the wafers (i.e. the workpiece to be cut), and in the ultrasonic vibration cutting apparatus, a disk-like cutting blade (an example of the machining tool) is attached to one end of an ultrasonic resonator (i.e. an ultrasonic vibration rotating mechanism) disposed such that the axial directions of the ultrasonic resonator are the horizontal directions. This ultrasonic vibration cutting apparatus cuts the wafers by linearly moving the cutting blade while rotating the cutting blade and applying radial-direction ultrasonic vibrations to the cutting blade.

Since patent literature 1 has a cantilever structure where the cutting blade is attached to the one end of the ultrasonic resonator, the one end side of the ultrasonic resonator has a tendency to tilt due to the reaction force from the wafers during the machining operations. Thus, there is a problem that the cutting speed is restricted and the machining time is prolonged. On the other hand, e.g., patent literatures 2 and 3 each disclose an apparatus adopting a both-side support structure, in which an ultrasonic resonator (i.e. an ultrasonic vibration resonator) including an ultrasonic horn with a vibration action part or a rotating blade (an example of the machining tool) attached and two boosters connected one by one to both ends in the axial directions of the ultrasonic horn is used and the both end sides in the axial directions are supported.

In the cases of supporting the ultrasonic resonator at both sides as in patent literatures 2 and 3, to keep an effective stationary wave, it is necessary that either one of the supported parts is not fixed in the vibrating directions of the ultrasonic waves, that is, the axial directions of the ultrasonic resonator, so that one of the both ends of the ultrasonic resonator becomes a free end.

In keeping with this, in patent literature 2, for convenience of engagement with the rotary driving source, one side of the ultrasonic resonator that is on the side of the booster of the driving source side (i.e. the first booster side of the ultrasonic resonator) is supported via the inner shell by the bearing part (i.e. the arm) fixed to the holder, and thus, the first booster side of the ultrasonic resonator is fixed in the axial directions, whereas, the other side of the ultrasonic resonator that is on the other booster side (i.e. the second booster side of the ultrasonic resonator) is supported so as to be able to slide in the vibrating directions of the ultrasonic waves, that is, the axial directions of the ultrasonic resonator, by the bearing part (i.e. the arm) attached to the guide rail, and thus, the second booster side end of the ultrasonic resonator is a free end. At this time, along the outer circumference of each cylindrical booster, a support similar to the ones shown in FIGS. 1 to 3 of patent literature 4 and in FIG. 2 of patent literature 5 is provided. This support is made into a skirt-shaped flange, and at a part of the support (i.e. the cylindrical part parallel to the axial directions of the ultrasonic resonator), a thin part (i.e. a thin intermediate part) for absorbing the vibrating energy in the radial directions is provided.

In patent literature 3, the both sides of the ultrasonic resonator are each supported by the air bearing (i.e. gas bearing) so as to be able to rotate, and for convenience of engagement with the rotary driving source, one side of the ultrasonic resonator on the side of the booster of the driving source side (i.e. the first booster side of the ultrasonic resonator) is fixed in the axial directions by the thrust air bearing, and the other side of the ultrasonic resonator on the other booster side (i.e. the second booster side of the ultrasonic resonator) is supported so as to be able to slide in the vibrating directions of the ultrasonic waves, that is, the axial directions of the ultrasonic resonator, inside the air bearing (i.e. the radial bearing), and thus, the second booster side end of the ultrasonic resonator is a free end.

CITATION LIST

Patent Literature

Patent Literature 1: Japanese Unexamined Patent Application Publication No. 2000-210928
Patent Literature 2: Japanese Unexamined Patent Application Publication No. 2000-93894
Patent Literature 3: Japanese Unexamined Patent Application Publication No. 2018-126967
Patent Literature 4: Japanese Unexamined Utility Model Application Publication No. H03-98979
Patent Literature 5: Japanese Unexamined Utility Model Application Publication No. H03-87501

SUMMARY OF INVENTION

Technical Problem

However, in patent literature 2, since the both sides in the axial directions of the ultrasonic resonator are supported by the mechanical bearings, the ultrasonic resonator cannot smoothly rotate unless the shaft centers of the mechanical bearings of the both sides are aligned with each other. Nevertheless, such positioning is difficult and there is a problem of poor assembly work efficiency. Also, a support structure using a mechanical bearing is complicating and requires a number of parts. Thus, it takes time and effort to produce and disassemble the support structure and to replace the ultrasonic horn, and so, there is a problem of poor productivity and poor maintenance efficiency. Additionally, when using this support apparatus in a longitudinal state (where the axial directions of the ultrasonic resonator are in the straight-up-and-down directions), or in an inclined state (where the axial directions of the ultrasonic resonator are inclined to a horizontal surface), the weight of the rotating cylinder, the bearing, the arm and the like each attached to the second booster on the lower side is also applied to the support holding the first booster on the upper side. Thus, the thin part of the upper side support is more likely to have damage through long-time use. Besides, the weight of the second booster and the peripheral parts thereof affects the resonating state of the ultrasonic resonator, and so, there is a problem of poor durability and poor operational stability. Furthermore, it cannot be prevented during the machining operations that the cutting fluid goes inside the lower side bearing part or that the shavings get stuck into the lower side bearing part, and so, there is a problem of poor reliability.

On the other hand, in patent literature 3, the both sides in the axial directions of the ultrasonic resonator are supported by the air bearings. Also, the first and second rotating inner shells are respectively attached to the first and second boosters, whereas the first and second fixed outer shells are attached to the frame. The first and second rotating inner shells do not contact the first and second fixed outer shells, respectively. Thus, even when using the apparatus in a longitudinal state such that the axial directions of the ultrasonic resonator are in the straight-up-and-down directions, the weight (i.e. the load) applied to the support holding the first booster on the upper side is small. Therefore, in patent literature 3, even if adopting a support (i.e. a skirt-shaped flange) that has a thin part as a part thereof, as patent literatures 2, 4, and 5 do, damages of the thin part of the support become less likely to occur. However, for supporting the ultrasonic resonator in the axial directions, the thrust air bearing needs to be provided outside the first fixed outer shell. In this case, if the pressure of air supplied to the thrust air bearing changes when using the apparatus in a longitudinal state, the ultrasonic resonator moves up-and-down directions (i.e. the axial directions), which causes the machining position to be unstable, and so, there is a problem of failing to precisely carry out the machining operations.

The present invention has been made in consideration of the above circumstances, and has as its object to provide an ultrasonic resonator support structure and an ultrasonic vibration machining apparatus with excellent durability and reliability, which have a simple configuration so that the assembly and disassembly thereof are easily done thereby having excellent productivity and maintenance efficiency, are capable of stably operating regardless of the disposition state of the ultrasonic resonator, and are further capable of preventing occurrence of displacement of the machining position, thereby precisely carrying out the machining operations.

Solution to Problem

In order to achieve the above object, according to a first aspect of the present invention, there is provided an ultrasonic resonator support structure configured to support an ultrasonic resonator at both sides rotatably to a holder, the ultrasonic resonator including an ultrasonic horn with a machining tool attached and a first booster and a second booster coaxially connected one by one to both ends in the axial directions of the ultrasonic horn, the holder provided in the ultrasonic resonator support structure including:

a rolling bearing mechanism rotatably supporting the first booster side of the ultrasonic resonator; and a gas bearing mechanism rotatably supporting the second booster side of the ultrasonic resonator.

In here, the machining tool means a tool that is used for carrying out machining operations such as cutting, grinding, joining or the like.

In the ultrasonic resonator support structure according to the first aspect of the present invention, it is preferred that the rolling bearing mechanism include: a first fixed cylindrical part attached to one side of the holder; a ball bearing held inside the first fixed cylindrical part; and a cylindrical body holding the first booster thereinside, being supported by the ball bearing via an outer peripheral surface thereof, and rotating along with the ultrasonic resonator, and the gas bearing mechanism include: a second fixed cylindrical part attached to the other side of the holder; and a radial gas bearing part supporting the second booster via an outer peripheral surface thereof rotatably inside the second fixed cylindrical part.

In the ultrasonic resonator support structure according to the first aspect of the present invention, it is preferred that a supporting part held inside the cylindrical body be provided along the outer circumference of the first booster.

In the ultrasonic resonator support structure according to the first aspect of the present invention, it is preferred that the axial-direction length of each of the ultrasonic horn, the first booster, and the second booster be equal to an integer multiple of a one-half of a wave length of ultrasonic vibrations occurring in the ultrasonic resonator.

An ultrasonic vibration machining apparatus according to a second aspect of the present invention includes the ultrasonic resonator support structure according to the first aspect of the present invention.

In the ultrasonic vibration machining apparatus according to the second aspect of the present invention, it is preferred that the ultrasonic resonator be disposed in a state where the second booster side end of the ultrasonic resonator points obliquely downward or straight downward (i.e. in a state where the first booster side end of the ultrasonic resonator becomes on the upper side when the ultrasonic resonator is disposed non-horizontally, that is, disposed obliquely or vertically).

Advantageous Effects of Invention

In the ultrasonic resonator support structure according to the first aspect of the present invention, the first booster side of the ultrasonic resonator is rotatably supported by the rolling bearing mechanism and the second booster side of the ultrasonic resonator is rotatably supported by the gas bearing mechanism. By this, the structure supporting the second booster side is simplified and becomes lighter, and thus, the load applied to the rolling bearing mechanism supporting the first booster side and the supporting part attached to the first booster is reduced, thereby improving the durability, and furthermore, this improves the maintenance efficiency by making easier the replacement of the ultrasonic horn. Also, even if the air gap of the gas bearing mechanism supporting the second booster side is not uniform throughout the circumference, the shaft center of the ultrasonic resonator becomes stable because the first booster side is mechanically supported by the rolling bearing mechanism. Thus, precise positioning (i.e. shaft alignment) in the relation between the rolling bearing mechanism and the gas bearing mechanism is not necessary, and therefore, the assembly work efficiency is excellent. Besides, since the ultrasonic resonator is mechanically supported by the rolling bearing mechanism on the first booster side, even if the supply pressure of gas supplied to the gas bearing mechanism changes, the ultrasonic resonator does not move in the axial directions, and thus, the stability in supporting the ultrasonic resonator is excellent.

Since the ultrasonic vibration machining apparatus according to the second aspect of the present invention includes the ultrasonic resonator support structure according to the first aspect of the present invention, the ultrasonic vibration machining apparatus is capable of securely supporting the ultrasonic resonator and stably operating, regardless of the disposition state. Also, even if the supply pressure of gas supplied to the gas bearing mechanism changes during the machining operations, the ultrasonic resonator does not move in the axial directions and displacement of the machining position does not occur, and thus, the machining operations are precisely carried out.

Also, in cases of disposing the ultrasonic resonator in a state where the second booster side end points obliquely downward or straight downward (i.e. in a state where the first booster side end becomes on the upper side), a lot of the cutting fluid or the shavings fall on the gas bearing mechanism on the second booster side; however, there is no need of installing a dedicated cover or the like on the second booster side because the pressurized gas being blasted out from the gas bearing mechanism prevents the cutting fluid from going inside the gas bearing mechanism or the shavings from getting stuck in the bearing part. Therefore, the durability, maintenance efficiency, and operational stability are excellent.

DESCRIPTION OF EMBODIMENT

An embodiment of the present invention will be subsequently described with reference to the accompanying drawings to provide an understanding of the present invention.

Figure 1:
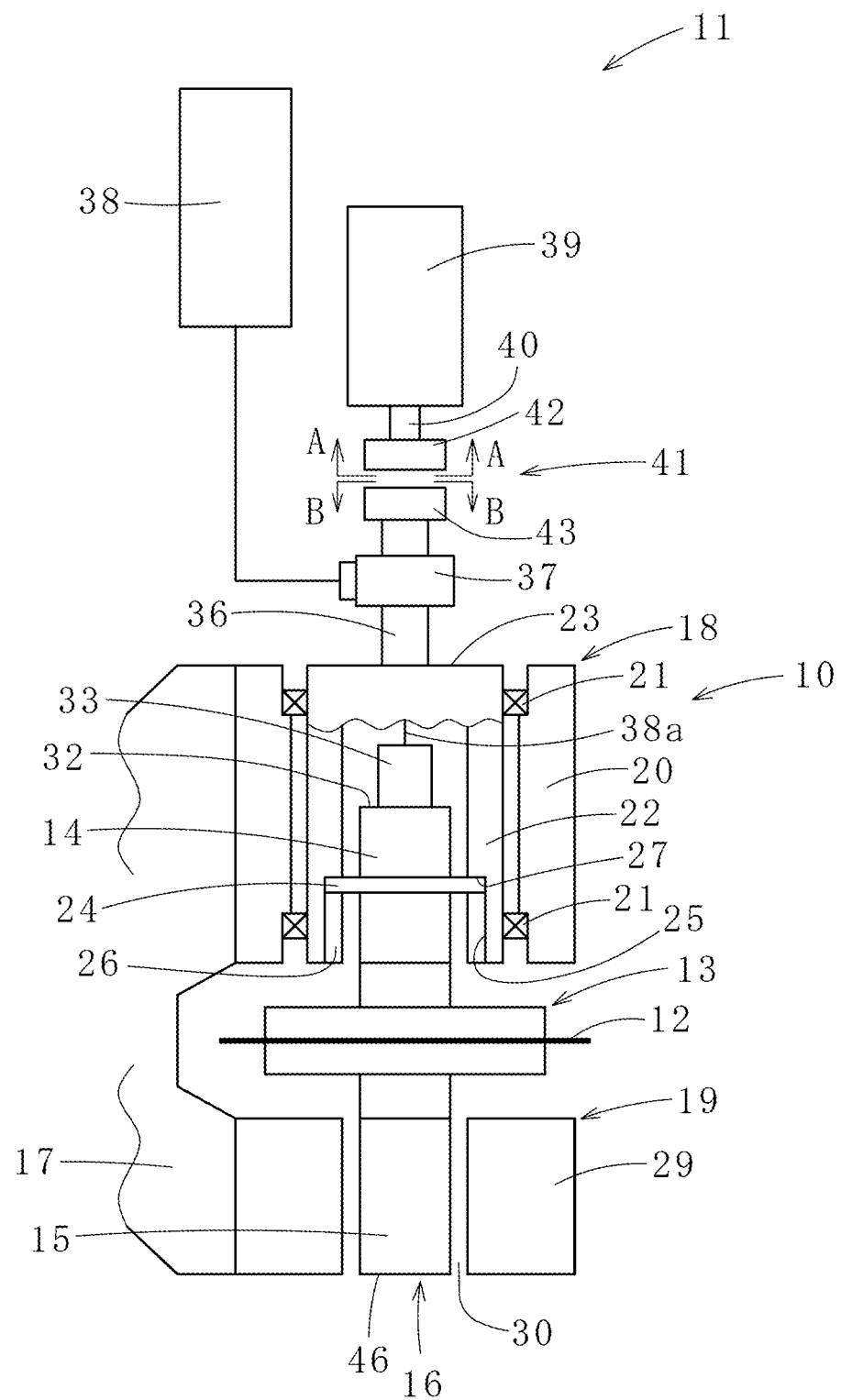
FIG. 1 is a simplified explanatory view illustrating the main part of the ultrasonic vibration machining apparatus including the ultrasonic resonator support structure according to an embodiment of the present invention.

FIG. 1 illustrates an ultrasonic vibration machining apparatus 11 including an ultrasonic resonator support structure 10 according to the embodiment of the present invention. The ultrasonic vibration machining apparatus 11 performs machining operations (e.g. cutting, grinding, or the like) of the hard and brittle materials such as silicon wafers by using a rotating blade (an example of the machining tool) 12 that rotates while ultrasonically vibrating in the radial directions. As shown in FIG. 1, the ultrasonic resonator support structure 10 is a structure configured to support an ultrasonic resonator 16 at both sides such that the ultrasonic resonator 16 is rotatable to a holder 17, in which the ultrasonic resonator 16 includes an disk-like ultrasonic horn 13 with the rotating blade 12 attached and a first cylindrical booster 14 and a second cylindrical booster 15 coaxially connected one by one to both ends in the axial directions of the ultrasonic horn 13. The ultrasonic horn 13 and the first and second boosters 14 and 15 may be made from an identical material so that the ultrasonic waves propagate evenly, or may be made from different materials, that is, the combination of the materials may be selected as appropriate. The holder 17 has a rolling bearing mechanism 18 rotatably supporting the first booster 14 side of the ultrasonic resonator 16 and a gas bearing mechanism 19 rotatably supporting the second booster 15 side of the ultrasonic resonator 16.

The rolling bearing mechanism 18 includes a first fixed cylindrical part 20 attached to one side (in here, the upper side) of the holder 17, ball bearings 21 held inside the first fixed cylindrical part 20, and a cylindrical body 22 that holds the first booster 14 thereinside; is supported by the ball bearings 21 via the outer peripheral surface; and rotates along with the ultrasonic resonator 16. One end in the axial directions (in here, the upper side end) of the cylindrical body 22 is closed by a closure 23, and the other end in the axial directions (in here, the lower side end, that is, the ultrasonic horn 13 side end) of the cylindrical body 22 opens. Along the outer circumference of the first booster 14, a brim-like supporting part 24 held inside the cylindrical body 22 is provided in a manner where the supporting part 24 sticks out from the outer peripheral surface of the first booster 14. At the other end in the axial directions (i.e. the open end) of the cylindrical body 22, an expanded portion 25 of the inside space is formed, and by fitting the supporting part 24 into the expanded portion 25, the first booster 14 is concentrically disposed inside the cylindrical body 22. Then, by screwing a cylindrical fastening part 26 into a female screw part (not shown in the figures) formed on the inner peripheral surface of the expanded portion 25 and holding the supporting part 24 between a gap end face 27 and an end face of the fastening part 26 both on one end side (the opposite side of the open end, in here, the upper side) of the expanded part 25, the first booster 14 is held inside the cylindrical body 22.

Although the ball bearings 21 are provided at two positions (i.e. upper and lower positions) in the axial directions of the first fixed cylindrical part 20 in this embodiment, the number and the arranging state of the ball bearing(s) may be selected as appropriate. Also, although it is preferred that the supporting part 24 be integratedly formed with the first booster 14, the shape of the supporting part 24 may be selected as appropriate, as long as the supporting part 24 serves as a buffer absorbing the ultrasonic vibrations (i.e. the vibration energy) in the radial directions of the first booster 14. For example, the supporting part 24 may be formed into a bellows shape capable of expansion and contraction along the radial directions, or may be formed into a skirt-shaped flange including a brim-like part and a thin cylindrical part. Also, the shape of the fastening part and the way of holding the supporting part inside the cylindrical body are not limited by the example described in this embodiment, but may be selected as appropriate.

The gas bearing mechanism 19 includes a second fixed cylindrical part 29 attached to the other side (in here, the lower side) of the holder 17, and a radial gas bearing part 30 that supports the outer peripheral surface of the second booster 15 such that the second booster 15 becomes rotatable inside the second fixed cylindrical part 29. The gas bearing mechanism 19 does not include a thrust bearing part, but have a structure of directly supporting the outer peripheral surface of the second booster 15 by using the radial gas bearing part 30. Thus, the structure supporting the second booster 15 side of the ultrasonic resonator 16 is simplified and becomes lighter, and the durability becomes improved by reducing the load applied to the supporting part 24. In addition to this, the productivity improves because the number of the parts declines thanks to the simplification and reduction in weight of the structure supporting the second booster 15 side of the ultrasonic resonator 16. Besides, since the replacement of the ultrasonic horn 13 becomes easier, the maintenance efficiency improves. Furthermore, since the load in the thrust direction in the cases where the ultrasonic resonator 16 is disposed such that the second booster 15 side end points obliquely downward or straight downward is received by the rolling bearing mechanism 18 (i.e. the ball bearings 21) that supports the first booster 14 side, the operations are stably carried out regardless of the disposition state (i.e. the disposition angle) of the ultrasonic resonator 16, and thus, the versatility is excellent.

To a free end face 32 (in here, the upper end face) of the first booster 14, a vibration source 33 (e.g. an electrostrictive vibrator) of the ultrasonic vibrations is attached. To the outside central part of the closure 23 of the cylindrical body 22, a rotating shaft 36 is attached such that the shaft center of the rotating shaft 36 becomes aligned with the shaft center of the cylindrical body 22 (i.e. the ultrasonic resonator 16). To an intermediate position in the axial directions (i.e. the longer side directions) of the rotating shaft 36, a slip ring 37 is provided, and driving signals from a high-frequency oscillator 38 are input to the vibration source 33 via the slip ring 37. The driving signals from the high-frequency oscillator 38 to be input via the slip ring 37 are transmitted to the vibration source 33 by a signal line 38a penetrating the inside of the rotating shaft 36 and the closure 23.

Figure 2:
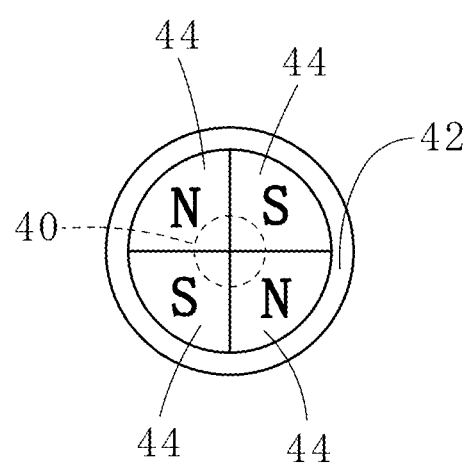
FIG. 2(A) is a figure viewed along the direction of the arrows A of FIG. 1.
FIG. 2(B) is a figure viewed along the direction of the arrows B of FIG. 1.
Figure 2:
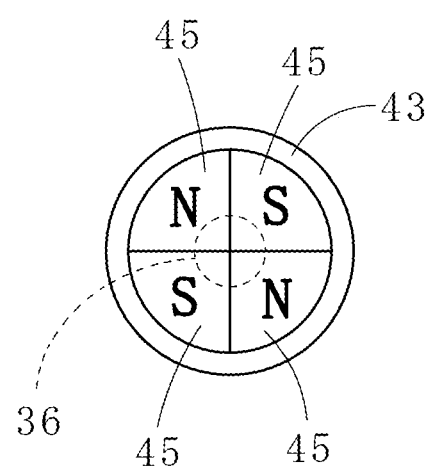

With the end (in here, the upper end, that is, the free end) of the rotating shaft 36, an output shaft 40 of a rotary driving source 39 (e.g. an electric motor) that rotates the ultrasonic resonator 16 (i.e. the first booster 14, the ultrasonic horn 13, and the second booster 15 concatenated in series) along with the cylindrical body 22, is connected via a contactless magnetic coupling 41 that is an example of a contactless coupling. The contactless magnetic coupling 41 includes a drive-side magnetic force part 42 attached to the end of the output shaft 40 of the rotary driving source 39, and a driven-side magnetic force part 43 attached to the free end of the rotating shaft 36 so as to face the drive-side magnetic force part 42. As shown in FIGS. 2(A) and 2(B), the drive-side magnetic force part 42 and the driven-side magnetic force part 43 have an identical number (in here, four) of permanent magnets 44 and 45, respectively, and the permanent magnets 44 and 45 are arranged such that the magnetic pole faces of opposite polarities face each other. By the attractive force arises between the permanent magnets 44 of the drive-side magnetic force part 42 and the opposed permanent magnets 45 of the driven-side magnetic force part 43, the drive-side magnetic force part 42 and the driven-side magnetic force part 43 are contactlessly connected. As a result, the rotational power from the rotary driving source 39 is transmitted from the output shaft 40 to the rotating shaft 36 via the contactless magnetic coupling 41, thereby rotating the ultrasonic resonator 16 along with the cylindrical body 22.

Since the rotating shaft 36 of the cylindrical body 22 and the output shaft 40 of the rotary driving source 39 are connected via the contactless magnetic coupling 41, even if the shaft center of the ultrasonic resonator 16 (i.e. the rotating shaft 36) is displaced or tilted with respect to the shaft center of the output shaft 40 of the rotary driving source 39, they do not interfere with each other and their smooth rotating state is maintained.

The details of the ultrasonic resonator 16 will be subsequently explained.

Figure 3:
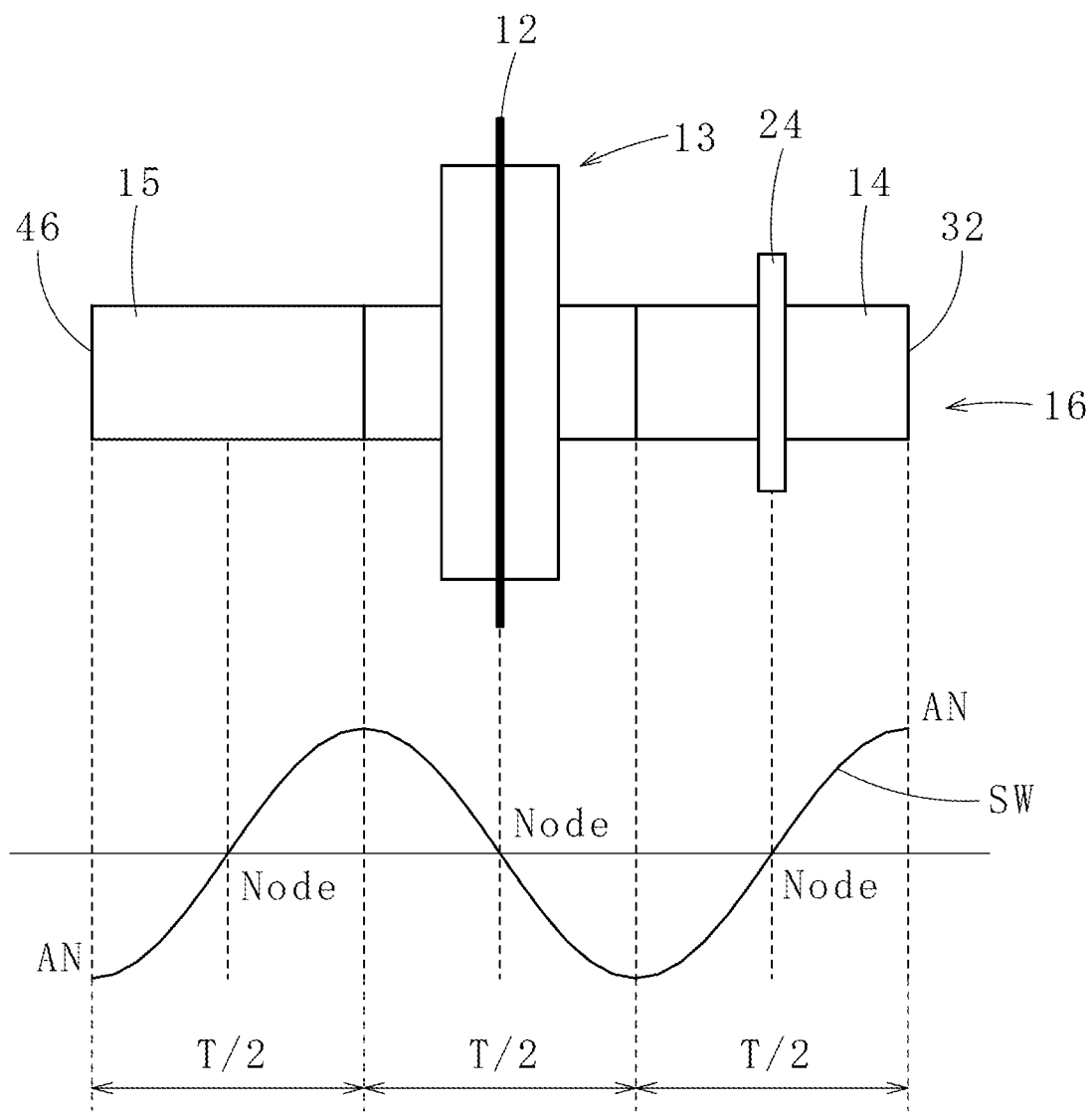
FIG. 3 is an explanatory view illustrating the state of a standing wave arising inside the ultrasonic resonator of the same ultrasonic vibration machining apparatus.

When performing the machining operations (e.g. cutting, grinding, or the like) with the ultrasonic vibration machining apparatus 11, the rotary driving source 39 rotates the ultrasonic resonator 16, and by this, the rotating blade 12 attached to the ultrasonic horn 13 rotates. Meanwhile, due to the vibrations caused by the vibration source 33, a standing wave (i.e. a stationary wave) SW of the ultrasonic vibrations arises inside the ultrasonic resonator 16, and the rotating blade 12 is made to ultrasonically vibrate in the radial directions by the ultrasonic horn 13 (R/L conversion). At this time, by setting the axial-direction lengths of the ultrasonic horn and the first and second boosters 14 and 15 of the ultrasonic resonator 16 such that each axial-direction length becomes equal to a one-half of a wave length T (i.e. equal to T/2) of the ultrasonic vibrations occurring in the ultrasonic resonator 16 as shown in FIG. 3, the ultrasonic resonator 16 is made more compact (i.e. to be the shortest), and besides, the attenuation of the ultrasonic vibrations inside the ultrasonic resonator 16 is reduced, and thus, the standing wave SW is effectively produced. In particular, by setting the positions in the axial directions of the ultrasonic resonator 16 to which the rotating blade 12 and the supporting part 24 are each to be attached such that these positions each correspond to the position of one of the nodes (Node) of the standing wave SW, the ultrasonic vibrations are efficiently utilized. At this time, the positions of a free end face 32 of the first booster 14 and the free end face 46 of the second booster 15 each correspond to the position of one of the antinodes (AN). Therefore, when the axial-direction length of each of the ultrasonic horn and the first and second boosters is equal to an integer multiple of a one-half of the wave length T (i.e. equal to an integer multiple of T/2) of the ultrasonic vibrations occurring in the ultrasonic resonator, the same function and effect are provided.

Incidentally, the standing wave SW is easily produced by adjusting (i.e. selecting) each axial-direction length of the ultrasonic horn 13 and the first and second boosters 14 and 15 based on the oscillation frequency of the ultrasonic vibrations used.

In the ultrasonic vibration machining apparatus 11, the rolling bearing mechanism 18 supporting the first booster 14 side of the ultrasonic resonator 16 has excellent stiffness and accuracy in alignment, and the gas bearing mechanism 19 supporting the second booster 15 side of the ultrasonic resonator 16 supports the outer peripheral surface of the second booster 15 via the radial gas bearing part 30 (i.e. there is an air gap around the outer peripheral surface of the second booster 15). Thus, there is no need of precise positioning in the relation between the rolling bearing mechanism 18 and the gas bearing mechanism 19, and thus, the assembly is easily carried out.

Additionally, since the first booster 14 of the ultrasonic resonator 16 is mechanically supported by the rolling bearing mechanism 18 via the supporting part 24, even if the supply pressure of the gas supplied to the gas bearing mechanism 19 changes during the machining operations, the ultrasonic resonator 16 does not move in the axial directions. Therefore, the displacement of the machining position is reliably prevented and the machining operations are precisely carried out.

Furthermore, since the supporting part 24 of the first booster 14 held inside the cylindrical body 22 also serves as a buffer absorbing the ultrasonic vibrations in the radial directions of the first booster 14, even if the shaft diameter of the first booster 14 changes due to the ultrasonic vibrations, the change is not transmitted to the cylindrical body 22, and thus, no additional load is applied to the ball bearings 21 or the first fixed cylindrical part 20. Therefore, the cylindrical body 22 is stably supported.

In the gas bearing mechanism 19 supporting the second booster 15 side of the ultrasonic resonator 16, the pressurized gas is blasted out toward the ultrasonic horn side. By this, even when the cutting fluid or the shavings produced during the machining operations flow toward the gas bearing mechanism 19 on the lower side in the cases where the ultrasonic resonator 16 is disposed in a state where the second booster 15 side end of the ultrasonic resonator 16 points obliquely downward or straight downward, the cutting fluid or the shavings are bounced off (blown away by) the pressurized gas. Therefore, the cutting fluid never goes inside the radial gas bearing part 30 (i.e. the air gap around the outer peripheral surface of the second booster 15) and causes rust, and the shavings never get stuck inside and cause malfunction in operation (rotation) of the radial gas bearing part 30, and thus, the durability, maintenance efficiency, and operational stability are excellent.

A modification of the ultrasonic resonator will be subsequently described.

Figure 4:
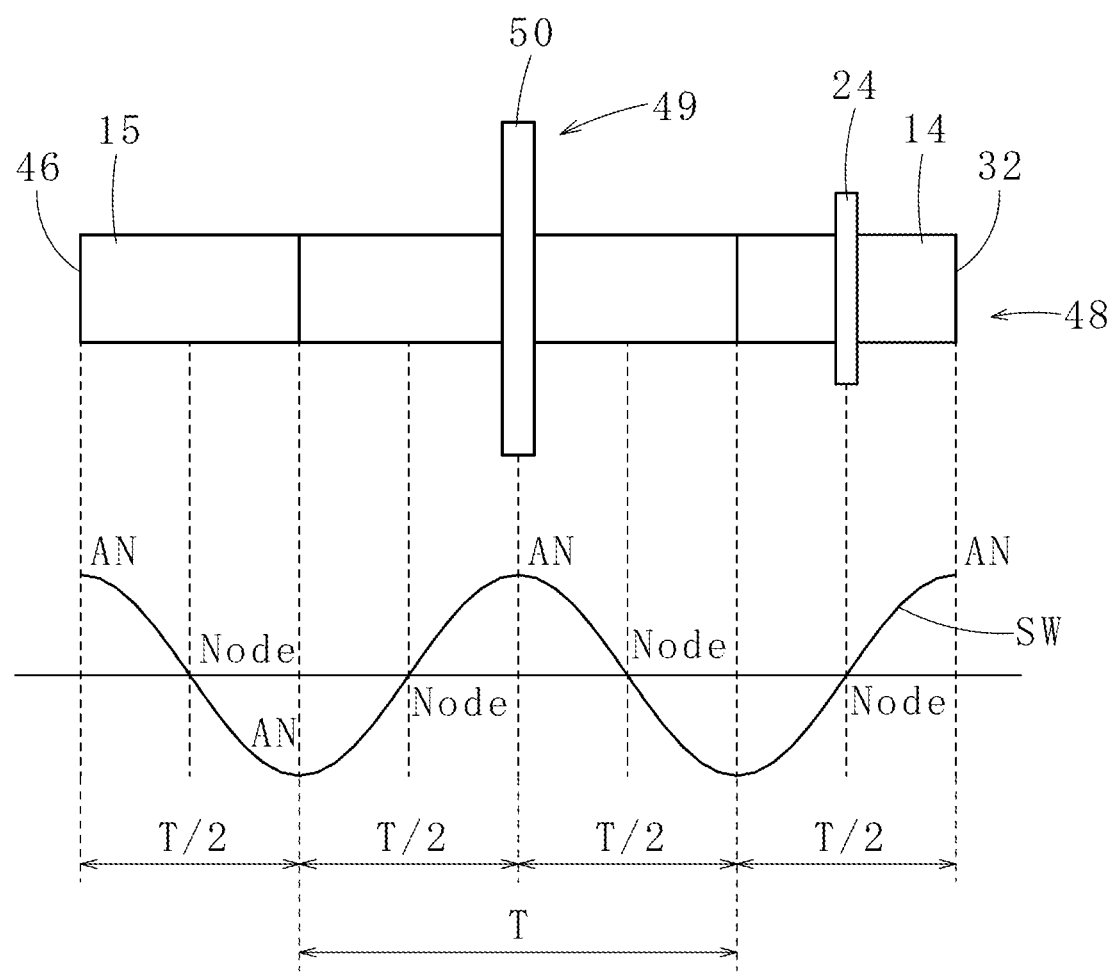
FIG. 4 is an explanatory view illustrating the state of a standing wave arising inside the ultrasonic resonator of a modification of the same ultrasonic vibration machining apparatus.

In the ultrasonic resonator 16, the rotating blade 12 as the machining tool is attached to the ultrasonic horn 13 to perform machining operations such as cutting, grinding, or the like. However, in the case of an ultrasonic resonator 48 shown in FIG. 4, a disk-like joining action part 50 is attached as the machining tool to the ultrasonic horn 49 in order to perform ultrasonic joining operations. In here, the axial-direction length of the ultrasonic horn 49 is equal to the wave length T (i.e. equal to twice T/2) of the ultrasonic vibrations that arise in the ultrasonic resonator 48, and the position of the joining action part 50 corresponds to the position of one of the antinodes (AN) of the standing wave SW. By this, when the ultrasonic horn 49 resonates in the axial directions, the joining action part 50 vibrates in the axial directions (in FIG. 4, the lateral directions) in the same mode of vibration as the ultrasonic horn 49, and thus, the joining of the workpieces is efficiently carried out.

The present invention has been described above with reference to the embodiment. However, the present invention is not limited to the structures described in the above embodiment, and the present invention includes other embodiments and modifications conceivable within the scope of the matters described in the scope of the claims. Additionally, any combination of the components within the above embodiment, other embodiments, or other modifications is also included in the present invention.

For example, in the above embodiment, the rotating shaft and the rotary driving source are indirectly connected by using the contactless magnetic coupling that is an example of a contactless coupling; however, the rotary driving source may be directly connected to the rotating shaft or be connected with the rotating shaft via a flexible coupling, as long as the rotary driving source is capable of rotating the cylindrical body along with the ultrasonic resonator.

INDUSTRIAL APPLICABILITY

Since the ultrasonic resonator support structure and the ultrasonic vibration machining apparatus according to the present invention have a simple configuration, they can be easily assembled and disassembled, and therefore, have excellent productivity and maintenance efficiency. Also, they stably operate regardless of the disposition state of the ultrasonic resonator and are capable of preventing occurrence of displacement of the machining position, and therefore, they are useful when there is a need for accurately and efficiently performing machining operations, e.g., cutting, grinding, or ultrasonic joining, to the hard and brittle materials such as the semiconductor wafers (i.e. the silicon wafers).

REFERENCE SIGNS LIST

10: ultrasonic resonator support structure, 11: ultrasonic vibration machining apparatus, 12: rotating blade, 13: ultrasonic horn, 14: first booster, 15: second booster, 16: ultrasonic resonator, 17: holder, 18: rolling bearing mechanism, 19: gas bearing mechanism, 20: first fixed cylindrical part, 21: ball bearing, 22: cylindrical body, 23: closure, 24: supporting part, 25: expanded portion, 26: fastening part, 27: gap end face, 29: second fixed cylindrical part, 30: radial gas bearing part, 32: free end face, 33: vibration source, 36: rotating shaft, 37: slip ring, 38: high-frequency oscillator, 38*a*: signal line, 39: rotary driving source, 40: output shaft, 41: contactless magnetic coupling, 42: drive-side magnetic force part, 43: driven-side magnetic force part, 44, 45: permanent magnet, 46: free end face, 48: ultrasonic resonator, 49: ultrasonic horn, 50: joining action part

The invention claimed is:

1. An ultrasonic resonator support structure configured to support an ultrasonic resonator at both sides rotatably to a holder, the ultrasonic resonator including an ultrasonic horn with a machining tool attached and a first booster and a second booster coaxially connected one by one to both ends in axial directions of the ultrasonic horn, the holder provided in the ultrasonic resonator support structure comprising:
   a rolling bearing mechanism rotatably supporting a first booster side of the ultrasonic resonator; and
   a gas bearing mechanism rotatably supporting a second booster side of the ultrasonic resonator, wherein the rolling bearing mechanism supports a force applied in a thrust direction, and the gas bearing mechanism rotatably supports the second booster side of the ultrasonic resonator by a radial gas bearing part.

2. The ultrasonic resonator support structure set forth in claim 1, wherein
   the rolling bearing mechanism includes: a first fixed cylindrical part attached to one side of the holder; a ball bearing held inside the first fixed cylindrical part; and a cylindrical body holding the first booster thereinside, being supported by the ball bearing via an outer peripheral surface thereof, and rotating along with the ultrasonic resonator, and
   the gas bearing mechanism includes: a second fixed cylindrical part attached to an opposite side of the holder opposite to the one side; and a radial gas bearing part supporting the second booster via an outer peripheral surface thereof rotatably inside the second fixed cylindrical part.

3. The ultrasonic resonator support structure set forth in claim 2, wherein a supporting part held inside the cylindrical body is provided along an outer circumference of the first booster.

4. The ultrasonic resonator support structure set forth in claim 1, wherein the axial-direction length of each of the ultrasonic horn, the first booster, and the second booster is equal to an integer multiple of a one-half of a wave length of ultrasonic vibrations occurring in the ultrasonic resonator.

5. The ultrasonic resonator support structure set forth in claim 2, wherein the axial-direction length of each of the ultrasonic horn, the first booster, and the second booster is equal to an integer multiple of a one-half of a wave length of ultrasonic vibrations occurring in the ultrasonic resonator.

6. The ultrasonic resonator support structure set forth in claim 3, wherein the axial-direction length of each of the ultrasonic horn, the first booster, and the second booster is equal to an integer multiple of a one-half of a wave length of ultrasonic vibrations occurring in the ultrasonic resonator.

7. An ultrasonic vibration machining apparatus comprising the ultrasonic resonator support structure set forth in claim 1.

8. The ultrasonic vibration machining apparatus comprising the ultrasonic resonator support structure set forth in claim 2.

9. The ultrasonic vibration machining apparatus comprising the ultrasonic resonator support structure set forth in claim 3.

10. The ultrasonic vibration machining apparatus comprising the ultrasonic resonator support structure set forth in claim 4.

11. The ultrasonic vibration machining apparatus comprising the ultrasonic resonator support structure set forth in claim 5.

12. The ultrasonic vibration machining apparatus comprising the ultrasonic resonator support structure set forth in claim 6.

13. The ultrasonic vibration machining apparatus set forth in claim 7, wherein the ultrasonic resonator is disposed in a state where a second booster side end of the ultrasonic resonator points obliquely downward or straight downward.

14. The ultrasonic vibration machining apparatus set forth in claim 8, wherein the ultrasonic resonator is disposed in a state where a second booster side end of the ultrasonic resonator points obliquely downward or straight downward.

15. The ultrasonic vibration machining apparatus set forth in claim 9, wherein the ultrasonic resonator is disposed in a state where a second booster side end of the ultrasonic resonator points obliquely downward or straight downward.

16. The ultrasonic vibration machining apparatus set forth in claim 10, wherein the ultrasonic resonator is disposed in a state where a second booster side end of the ultrasonic resonator points obliquely downward or straight downward.

17. The ultrasonic vibration machining apparatus set forth in claim 11, wherein the ultrasonic resonator is disposed in a state where a second booster side end of the ultrasonic resonator points obliquely downward or straight downward.

18. The ultrasonic vibration machining apparatus set forth in claim 12, wherein the ultrasonic resonator is disposed in a state where a second booster side end of the ultrasonic resonator points obliquely downward or straight downward.

* * * * *